(No Model.)
A. D. GOODWIN.
MEANS FOR PROTECTING TREES FROM VERMIN.
No. 555,901. Patented Mar. 3, 1896.
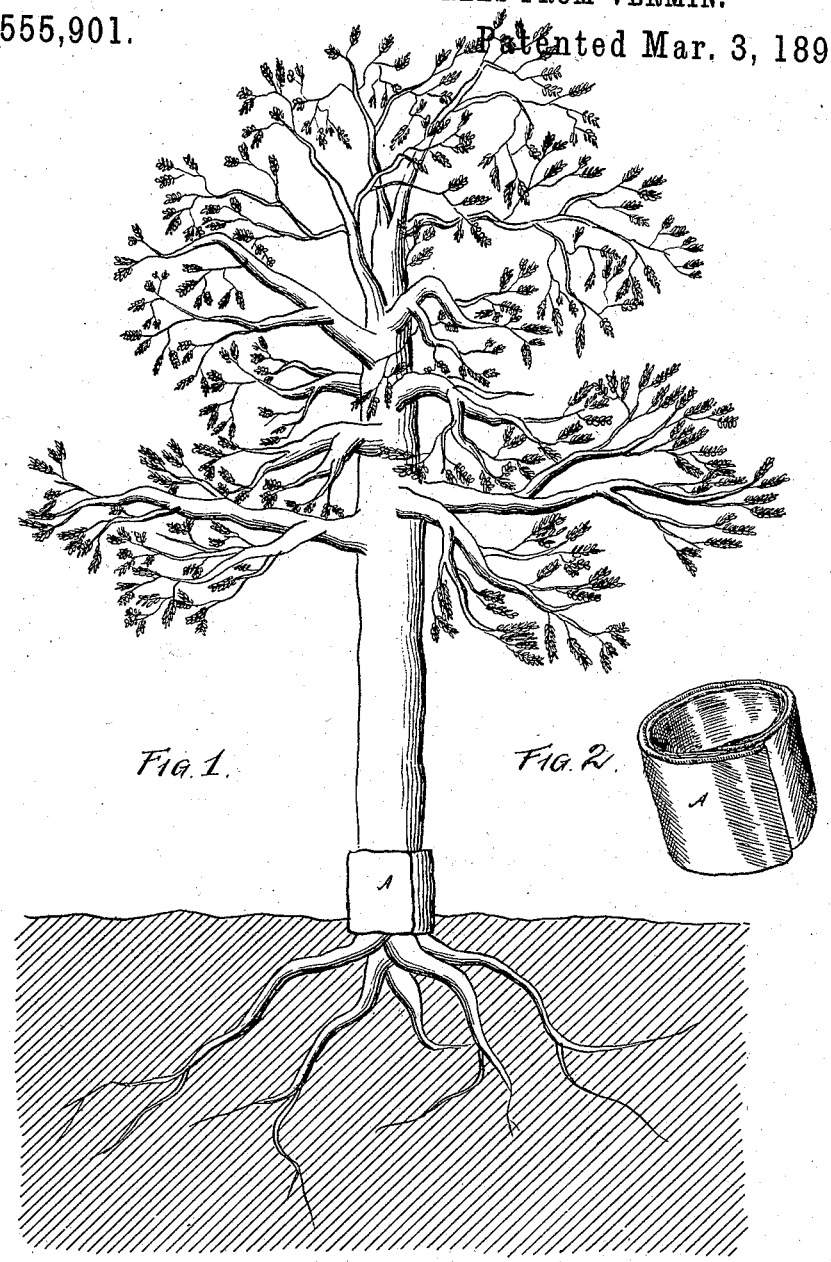
WITNESSES
INVENTOR

UNITED STATES PATENT OFFICE.

ADOLPHUS D. GOODWIN, OF HARAN, ASSIGNOR OF ONE-HALF TO WILLIAM S. SURFACE, OF RINER, VIRGINIA.

MEANS FOR PROTECTING TREES FROM VERMIN.

SPECIFICATION forming part of Letters Patent No. 555,901, dated March 3, 1896.

Application filed June 13, 1895. Serial No. 552,689. (No specimens.)

*To all whom it may concern:*

Be it known that I, ADOLPHUS D. GOODWIN, a citizen of the United States, and a resident of Haran, in the county of Roanoke and State of Virginia, have invented certain new and useful Improvements in Means for Protecting Trees from Vermin, &c.; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of the invention applied. Fig. 2 is a perspective view of bandage.

The object of this invention is to provide means which will effectually protect fruit and other trees from the attacks of small animals, insects, and other vermin; and the invention consists in the provision of an armor which is adapted to encircle the base of the tree, and which consists of a wrapping or covering of suitable fabric upon which is spread a layer or coating of the compound hereinafter described. The armor is also arranged in such a manner as not to interfere with the growth of the tree, while the nature of the compound is such that it not only causes the armor to adhere to the tree without the use of fastening devices, but will kill all worms that may be in the tree at the time of its application, will heal any wounds that may be in the tree, and will protect it from the attacks of moth, rabbits and ground-mice, as well as from freezing.

In carrying out my invention I provide coverings, wrappings, or bandages A, which may be of canvas, old sacks or other suitable material.

To one gallon of coal-tar I add two pounds of flour of sulphur, two pounds of beeswax, and two pounds of beef-tallow. These ingredients are melted and thoroughly mixed together, after which I sift in slaked lime until the compound is of such consistency that it forms a thin plaster. This plaster is spread upon the bandage while it is warm.

In applying the armor the earth is removed from around the tree to where the roots branch out and the bandage with its coating is wrapped around the base of the tree. The bandage should be long enough to go around the tree and to lap from two to four inches in order to allow for the growth of the tree. The coating or compound will adhere to the tree and no fastening devices are required. The nature of the compound is such that it does not harden and become flaky; but it will remain in a more or less soft and plaster state for a long period.

Should there be wounds in the tree formed by the "borer-worm," the above-described armor, by retaining the sap and excluding air and water, will permit such wounds to heal readily and save the tree.

Having thus described my invention, what I claim as new, and desire to secure by Letters Patent, is—

The herein-described armor for fruit and other trees, said armor consisting of a wrap or bandage of fabric of sufficient length to enable it to encircle a tree and to overlap at its meeting portions and having an adhesive lining composed of a mixture of coal-tar, sulphur, beef-tallow, beeswax, and lime, all melted and mixed together in the proportions substantially as specified.

In testimony whereof I affix my signature in presence of two witnesses.

A. D. GOODWIN.

Witnesses:
L. D. BELL,
W. J. BALDWIN.